Aug. 26, 1958
C. A. TUDBURY
2,849,584
MULTIPHASE INDUCTION BILLET HEATER
Filed Sept. 10, 1956
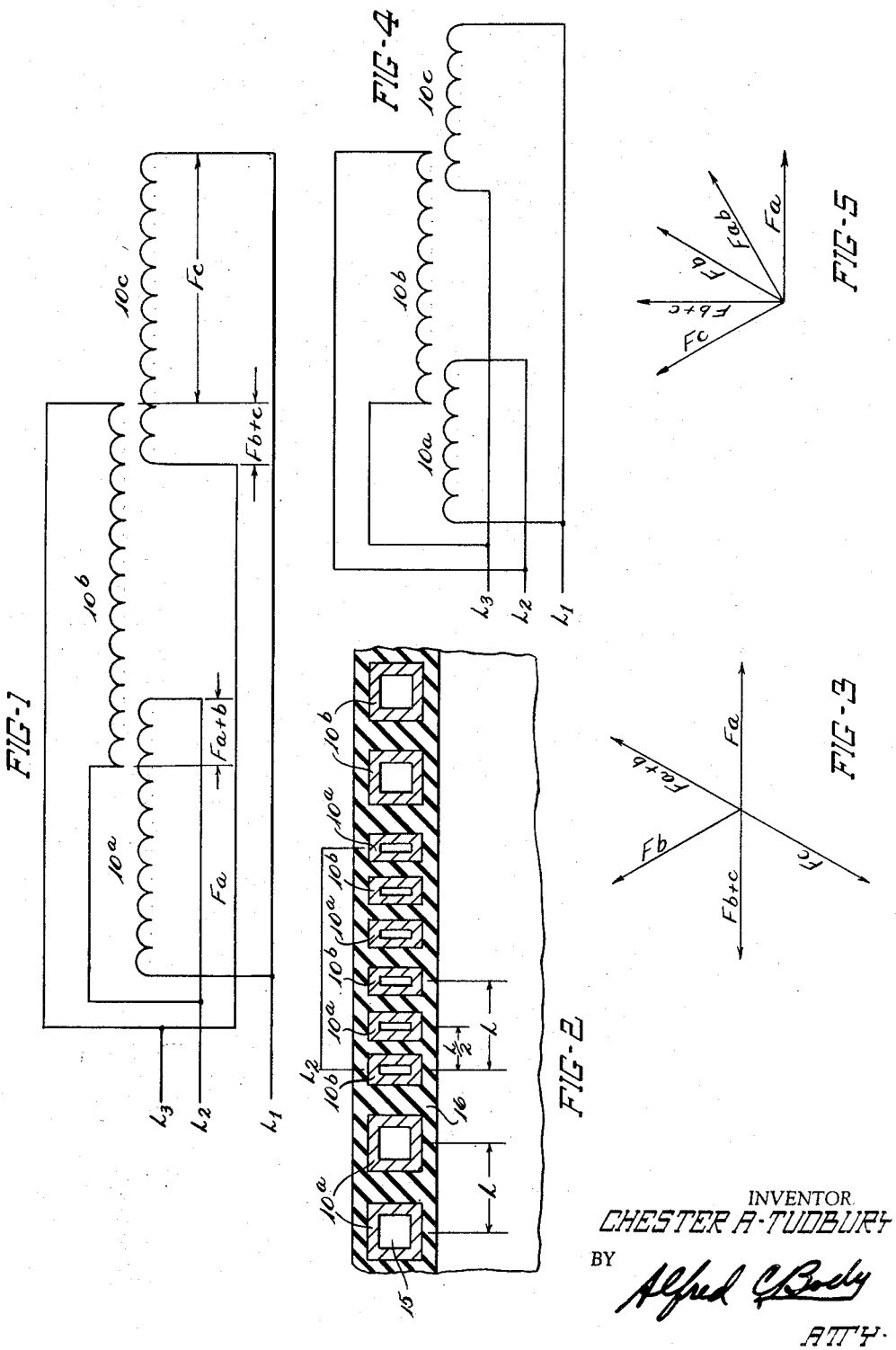
INVENTOR.
CHESTER A. TUDBURY
BY
Alfred C. Body
ATTY.

United States Patent Office 2,849,584
Patented Aug. 26, 1958

2,849,584
MULTIPHASE INDUCTION BILLET HEATER

Chester A. Tudbury, Cleveland, Ohio, assignor to The Ohio Crankshaft Company, Cleveland, Ohio, a corporation of Ohio Application September 10, 1956, Serial No. 608,960

3 Claims. (Cl. 219—10.75)

This invention pertains to the art of induction heating and, more particularly, to a coil arrangement for multiphase induction billet heaters.

The invention is particularly applicable to induction heating wherein the coils are energized from a three-phase power source and will be described with particular reference thereto, although it will be appreciated that any number of phases may be employed.

In the art of three-phase induction heating, it is conventional to employ one coil for each phase all in axially aligned relationship and with the ends of adjacent coils close spaced. With such an arrangement, the magnetic fields of the two coils differing in phase either by 60° or 120°, depending upon the manner in which the coils are connected to the power lines, interact with each other resulting in a reduction in the flux in the space between the ends of the two coils. Such reduction of flux results in a reduction of heating of that portion of the billet located in the space between the two coils. Special means must then be employed to obtain uniform heating of the billet.

The present invention contemplates an arrangement of the three coils which overcomes the above difficulties and enables substantially uniform heating to be obtained over the entire length of the three coils.

In accordance with the present invention, a plurality of coils, one for each phase of the power source are provided in axially aligned relationship with the turns of adjacent ends of coils interleaved one with the other for a plurality of turns. The two interleaved coils interact one with the other to produce a flux field of equal magnitude but halfway between the original two phases. Thus, instead of an abrupt phase shift between coil ends of 120°, as is customary, there will instead be a gradual flux change from one coil to the other of 60° in each step. The sections of the coil where interleaving takes place are preferably wound with turns whose width is slightly less than one-half the width of the conductors in the remaining parts of the coil. Thus, the magnitude of the magnetizing force from two adjacent turns will be the same in ampere turns per inch as the magnetizing force in the coil sections where only current of one phase is flowing.

The principal object of the invention is the provision of a new and improved coil arrangement for multiple phase induction heaters wherein a more uniform flux field over the entire length of the three coils can be obtained.

Another object of the invention is the provision of a new and improved arrangement of the coils in a multiple phase billet heater wherein the ends of adjacent coils are interleaved one with the other to provide a transitional flux field between the two coil sections spaced halfway between the phases of the two coil sections.

Another object of the invention is the provision of a new and improved three-phase billet heater heating coil assembly which is simple in construction, provides a balanced three-phase power on the power line and which provides uniform heating of billets within the coils.

The invention may take physical form in certain parts and arrangements of parts, a preferred embodiment of which will be described in detail in this specification and illustrated in the accompanying drawing, which is a part hereof and wherein, Figure 1 is a schematic wiring diagram of a three-phase billet heater illustrating a preferred embodiment of the invention, Figure 2 is a fragmentary cross-sectional view of a coil arrangement embodying the present invention showing how the turns of adjacent coil ends are interleaved, one with the other, Figure 3 is a phase diagram of the fluxes in the three coils, Figure 4 is a view similar to Figure 1 but showing an alternative wiring diagram, and Figure 5 is a vector diagram showing the phase relationships in the coils of Figure 4.

Referring now to the drawings wherein the showings are for the purposes of illustrating the preferred embodiments of the invention only, and not for the purposes of limiting same, Figure 1 shows three coils, 10a, 10b and 10c, which will jointly be referred to hereinafter by the reference character 10, which three coils, while shown in axially displaced relationship for the purposes of clarity, are in actual practice in axially aligned relationship. The coils 10a, 10b and 10c are connected to the three wires L-1, L-2, L-3 of a three-phase power system.

The coils 10 may have any desired construction, as is known in the art, and this specific construction forms no part of the present invention.

As shown in Figure 1, the adjacent ends of coils 10a and 10b overlap each other axially for several turns. In a like manner, the adjacent ends of coils 10b and 10c overlap each other axially for a plurality of turns.

With the connections of Figure 1, the phase relationships in the coils 10a, 10b and 10c, which do not overlap, are as shown in Figure 3. Thus, the phase relationship of coil 10b is 120° spaced in the phase relationship of the coil 10a. In a like manner, the phase of the coil 10c is spaced 120° from the phase of coil 10b. In the overlapping portions of the coils, however, the fluxes combine to provide a combined flux which is the vector sum of the fluxes in the two overlapping portions. If the currents in the two coils are the same, and the number of turns and spacing are the same, the flux in the overlapping portions of the coils 10a, 10b will be spaced 60° from the phase of the flux in either the coil 10a or the coil 10b. Similarly, the flux in the overlapping portions of the coils 10b, 10c will be spaced 60° from the flux of the coil 10b or the flux of the coil 10c. Using such an arrangement, the spacing of the two coils is 0 and there will be no portion along the length of the coils 10 which will have a reduced flux.

Figure 2 shows somewhat schematically the arrangement of the turns of the overlapping portions of coil 10a and 10b. Thus, the conductors of each turn are preferably in the form of hollow copper tubing, having a hollow interior 15 through which cooling water can be circulated continuously during the heating operation so as to remove heat generated by the $I^2R$ losses in the conductors or heat radiated to the conductors from billets within the heating coils. The turns in the non-overlapping portions 10a may have any desired spacing L and electrical insulation 16 is placed between turns. In the overlapping portions of the coils 10a, 10b, however, the axial width of the conductors is preferably reduced in half and the spacing between adjacent turns is $L_2$. The effective spacing of the interleaved turns, however, remains equal to L, as is shown. It will be appreciated that if desired all the conductors could be made of the same axial width and the spacing between the non-interleaved portions of the coil 10a and 10b will be spaced a greater distance than the interleaved turns of the interleaved portions.

If desired, the spacing between the interleaved turns may be varied from that shown if additional or different heating effects are desired.

The number of turns which are interleaved may vary depending upon a number of different factors; generally, at least four turns should be interleaved, although obviously more or less may be interleaved as desired.

Figure 4 shows an alternative circuit diagram wherein the center coil 10b is connected with reverse polarity to the wires L-2, L-3 to that shown in Figure 1. With such an arrangement, the phase relationship in the non-interleaved portions of the coils 10a, 10b and 10c is shown in Figure 5. It will be noted that the angular spacing between the flux Fa and the coil 10a relative to the flux Fb of the coil 10 is only spaced 60°. Similarly, the flux Fc of the coil 10c is spaced 60° from the flux Fb of the coil 10b. In the interleaved portions of the coils 10a, 10b, the flux Fab is spaced but 30° from the flux Fa and 30° from the flux Fd. Similarly, the flux Fbc of the interleaved portions of the coils 10b, 10c, is spaced 30° from the flux Fb and from the flux Fc.

With such an arrangement, it is possible to construct a three-phase multi-coil induction billet heater which will draw balanced three-phase currents from a balanced three-phase voltage source and which will have a magnetizing force of substantially constant magnitude throughout its length, except of course at the extreme entering and exit ends of the coil assembly.

The exact arrangements for insulating the various turns from each other is not shown, as it is believed that this is entirely within the skill of the art. Also, powers, heating times, voltages and currents, conductor sizes are not herein discussed as it is believed that these are entirely within the skill of those qualified in the induction heating art.

It will be appreciated that modifications and alterations will occur to others upon a reading and understanding of this specification, such modifications and alterations differing in appearance from the preferred embodiment herein described, and it is my intention to include all such modifications and alterations insofar as they come within the scope of the appended claims.

Having thus described my invention, I claim:

1. A three-phase billet heater, comprising in combination: three individual coil sections in axially aligned relationship and each adapted to be connected to a separate phase of a three-phase power source, the adjacent turns only of each pair of coils being interleaved one with the other, and in electrically insulated relationship from each other.

2. A three-phase billet heater, comprising in combination: three coils each adapted to be connected to a separate phase of a three-phase power source, said coils being in axially aligned relationship and having the adjacent turns only of the coils interleaved whereby to provide a uniform flux field throughout the length of the coil assembly.

3. A multiphase billet heater comprising in combination: a plurality of coils one for each phase in axially aligned relationship, the end turns of adjacent coils being electrically insulated one from the other and interwound whereby the flux field of the interwound portions will combine to produce a vector sum flux field midway between the fluxes of the adjacent coils, the turns per inch of each coil being uniform from one end to the other.

References Cited in the file of this patent

UNITED STATES PATENTS

| | | |
|---|---|---|
| 2,747,068 | Lackner | May 22, 1956 |
| 2,748,240 | McArthur | May 29, 1956 |